(12) United States Patent
Rowell et al.

(10) Patent No.: US 8,677,273 B2
(45) Date of Patent: Mar. 18, 2014

(54) SYSTEM AND METHOD FOR DISPLAYING MEDIA ITEMS

(75) Inventors: David Rowell, Bristol (GB); Jamie Innes, Bristol (GB); Timothy Geoghegan, Stroud (GB); Felix Corke, London (GB)

(73) Assignee: Nokia Corporation, Espoo (FI)

( * ) Notice: Subject to any disclaimer, the term of this patent is extended or adjusted under 35 U.S.C. 154(b) by 1014 days.

(21) Appl. No.: 11/933,687

(22) Filed: Nov. 1, 2007

(65) Prior Publication Data

US 2009/0119589 A1    May 7, 2009

(51) Int. Cl.
G06F 3/048    (2013.01)
G06F 3/01    (2006.01)

(52) U.S. Cl.
USPC ........... 715/810; 715/713; 715/716; 715/719; 715/803; 715/818; 715/835; 715/841

(58) Field of Classification Search
USPC ......... 715/713, 716, 719, 803, 810, 818–820, 715/828, 829, 835, 841, 853–855; 463/42
See application file for complete search history.

(56) References Cited

U.S. PATENT DOCUMENTS

| | | | | |
|---|---|---|---|---|
| 6,029,172 | A * | 2/2000 | Jorna et al. ............................. | 1/1 |
| 7,596,761 | B2 * | 9/2009 | Lemay et al. ................. | 715/779 |
| 7,698,654 | B2 * | 4/2010 | Fong et al. ................... | 715/810 |
| 7,761,812 | B2 * | 7/2010 | Ostojic et al. ................ | 715/835 |
| 2004/0233238 | A1 * | 11/2004 | Lahdesmaki ................. | 345/810 |
| 2006/0195516 | A1 | 8/2006 | Beaupre | |
| 2007/0162936 | A1 | 7/2007 | Stallings et al. | |
| 2008/0082935 | A1 * | 4/2008 | Relyea et al. ................. | 715/777 |
| 2008/0113789 | A1 * | 5/2008 | Canessa et al. ................. | 463/29 |
| 2008/0113805 | A1 * | 5/2008 | David et al. ..................... | 463/42 |
| 2008/0113809 | A1 * | 5/2008 | David et al. ..................... | 463/42 |
| 2008/0167133 | A1 * | 7/2008 | White et al. ..................... | 463/43 |
| 2008/0171600 | A1 * | 7/2008 | Ostergren et al. ............... | 463/42 |
| 2008/0209322 | A1 * | 8/2008 | Kaufman ....................... | 715/716 |
| 2009/0063972 | A1 * | 3/2009 | Ma et al. ....................... | 715/716 |
| 2009/0064057 | A1 * | 3/2009 | Bull et al. ..................... | 715/864 |

FOREIGN PATENT DOCUMENTS

| | | | |
|---|---|---|---|
| WO | 2004/062945 A | 7/2004 | |
| WO | 2007/031816 A | 3/2007 | |

OTHER PUBLICATIONS

International Search Report and Written Opinion, PCT/IB2008/002938, mailed Apr. 7, 2009.

* cited by examiner

*Primary Examiner* — Nicholas Augustine
(74) *Attorney, Agent, or Firm* — Alston & Bird LLP

(57) ABSTRACT

A method including presenting one or more tabs on a display of a device corresponding to media content screens, presenting one or more media content items in a media content screen upon selection of a corresponding one of the one or more tabs, the one or more media content items being presented in at least one of scrollable rows and columns, including minimized content information with some of the media content items and including intermediate content information with other media content items and changing at least the intermediate content information to detailed content information corresponding to a selected one of the content items.

20 Claims, 12 Drawing Sheets

SYSTEM AND METHOD FOR DISPLAYING MEDIA ITEMS

BACKGROUND

1. Field

The disclosed embodiments generally relate to user interfaces and, more particularly, to interfaces for presenting media content.

2. Brief Description of Related Developments

Generally when a user of an electronic device is looking for or browsing media content such as, for example, songs the user is presented with large amounts of information pertaining to the different songs and/or albums. For example, the user searching for a media content item may have to navigate through a generalized home page, such as on a web page, and then through genre pages that may have been linked to the home page. The user may have to navigate through various menus and/or display screens before the user is able to find a desired media content item.

It would be advantageous to be able to access and find media content quickly and easily from a large media catalogue.

SUMMARY

In one aspect, the disclosed embodiments are directed to a method. In one embodiment the method includes presenting one or more tabs on a display of a device corresponding to media content screens, presenting one or more media content items in a media content screen upon selection of a corresponding one of the one or more tabs, the one or more media content items being presented in at least one of scrollable rows and columns, including minimized content information with some of the media content items and including intermediate content information with other media content items and changing at least the intermediate content information to detailed content information corresponding to a selected one of the content items.

In another aspect, the disclosed embodiments are directed to an apparatus. In one embodiment the apparatus includes a processor and a display connected to the processor, wherein the processor is configured to present one or more tabs on the display corresponding to media content screens, present one or more media content items in a media content screen upon selection of a respective one of the one or more tabs, the one or more media content items being presented in scrollable rows and columns, where at least one of the rows and columns are individually scrollable or scrollable as a unit, include minimized content information with some of the media content items and include intermediate content information with other media content items and change at least the intermediate content information to detailed content information corresponding to a selected one of the content items.

In still another aspect, the disclosed embodiments are directed to a system. In one embodiment the system includes a communication device including an input device configured to cause selection of media content items, a display configured to display the media content items in one or more media content screens and a processor connected to the input and display, the processor being configured to present one or more tabs on the display corresponding to the media content screens, present one or more media content items in a media content screen upon selection of a respective one of the one or more tabs, the one or more media content items being presented in scrollable rows and columns, where at least one of the rows and columns are individually scrollable or scrollable as a unit, include minimized content information with some of the media content items and include intermediate content information with other media content items and change at least the intermediate content information to detailed content information corresponding to a selected one of the content items.

In another aspect, the disclosed embodiments are directed to a user interface. The user interface includes an input device configured to cause selection of media content items, a display configured to display the media content items in one or more media content screens and, a processor connected to the input device and display, the processor being configured to present one or more tabs on the display corresponding to media content screens, present one or more media content items in a media content screen upon selection of a respective one of the one or more tabs, the one or more media content items being presented in scrollable rows and columns, where at least one of the rows and columns are individually scrollable or scrollable as a unit, include minimized content information with some of the media content items and include intermediate content information with other media content items and change at least the intermediate content information to detailed content information corresponding to a selected one of the content items.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(s)

Figure 1:
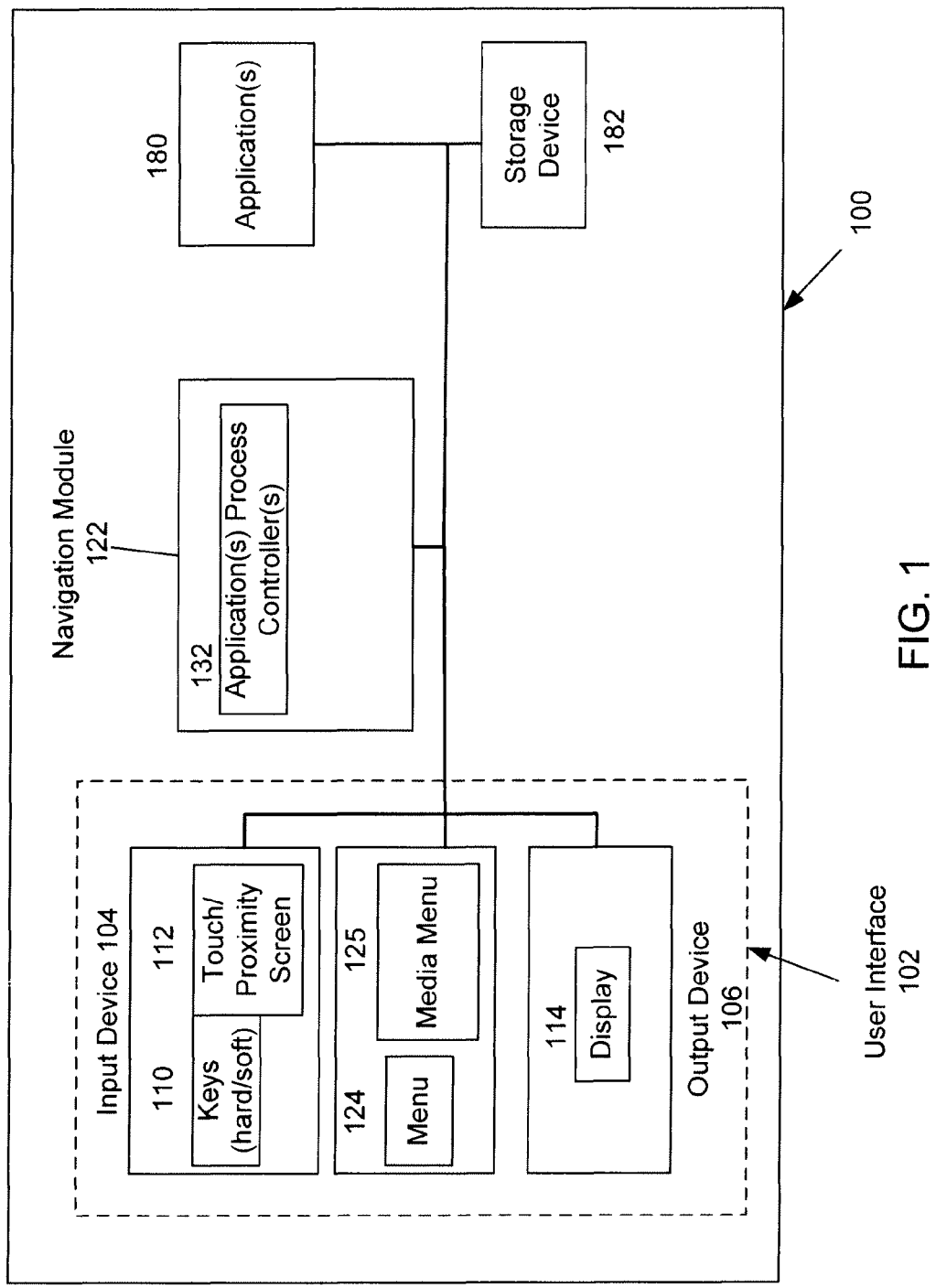
FIG. 1 shows a block diagram of a system in which aspects of the disclosed embodiments may be applied.

FIG. 1 illustrates one embodiment of a system 100 in which aspects of the disclosed embodiments can be used. Although aspects of the disclosed embodiments will be described with reference to the embodiments shown in the drawings and described below, it should be understood that these aspects could be embodied in many alternate forms. In addition, any suitable size, shape or type of elements or materials could be used.

The disclosed embodiments generally allow a user of a device or system, such as the system 100 shown in FIG. 1 to quickly and easily access and find media content from a large media catalogue. In accordance with the disclosed embodiments, a multi-media content user interface or media menu 125 is presented to the user of the system 100. The media menu 125 may include any suitable media information screens or "walls" that can be selectively presented to the user. The media information screens can be selected through tabs or any other suitable indicators for identifying the media information screens. For example, each screen may have a corresponding tab which when selected causes the screen to be presented to the user. The contents, colors, font types or any other suitable characteristics of the tabs may be user settable through, for example any suitable settings menu. The media menu 125 may be configured to present a preview of the tab contents (e.g. a preview of the screen corresponding to the tab).

In one aspect the media menu 125 includes a music screen that includes a carousel of music that, for example, scrolls across the display 114 of the system 100. The carousel of music may be a continuous carousel (e.g. has the appearance of not ending) or the carousel of music may have defined ends or stop points. In one embodiment, the carousel may stop scrolling when the last media content item in category is reached. The carousel may be configured to simulate a user flicking through, for example, compact disks (CD) at a music store while presenting a packshot to the user. The packshot may include, but is not limited to, an image(s) of the CD or single (e.g. one song on an album) cover, the artist's name, product titles and purchase prices. In other embodiments the packshot may include any suitable information. It is noted that while the disclosed embodiments will be described herein with respect to music, any suitable media may be presented in the manner described herein. For example, the disclosed embodiments apply equally to media including, but not limited to, video media, streaming media, downloadable media, still images, ring tones, wallpapers and screen savers. Each of the media information screens can include any suitable controls for presentation of the media content items such as, for example, volume controls, play—stop—pause—fast forward—rewind controls and suitable scroll bars or sliders for manipulating the media content items presented in the media information screens.

In one embodiment, referring to FIG. 1, the system can include an input device 104, output device 106, navigation module 122, applications area 180, and storage/memory device 182. The components described herein are merely exemplary and are not intended to encompass all components that can be included in the system 100. For example, in one embodiment, the system 100 comprises a mobile communication device or Internet and application enabled devices. In one embodiment the applications of the device may include, but are not limited to, data acquisition (e.g. image, video and sound) and multimedia players (e.g. video and music players). Thus, in alternate embodiments, the system 100 can include other suitable devices and applications for monitoring application content and acquiring data and providing communication capabilities in such a device. While the input device 104 and output device 106 are shown as separate devices, in one embodiment, the input device 104 and output device 106 can be combined and be part of, and form, the user interface 102. The user interface 102 can be used to display information pertaining to multi-media content as will be described below.

In one embodiment, the user interface of the disclosed embodiments can be implemented on or in a device that includes a touch screen display or a proximity screen device. In alternate embodiments, the aspects of the user interface disclosed herein could be embodied on any suitable device that will display information and allow the selection and activation of applications or system content. The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to encompass that a user only needs to be within the proximity of the device to carry out the desired function. For example, the term "touch" in the context of a proximity screen device, does not necessarily require direct contact, but can include near or close contact, that activates the proximity device.

Similarly, the scope of the intended devices is not limited to single touch or contact devices. Multi-touch devices, where contact by one or more fingers or other pointing devices can navigate on and about the screen are also intended to be encompassed by the disclosed embodiments. Non-touch devices are also intended to be encompassed by the disclosed embodiments. Non-touch devices include, but are not limited to, devices without touch or proximity screens, where navigation on the display is performed through, for example, keys 110 of the system or through voice commands via voice recognition features of the system.

Figure 2:
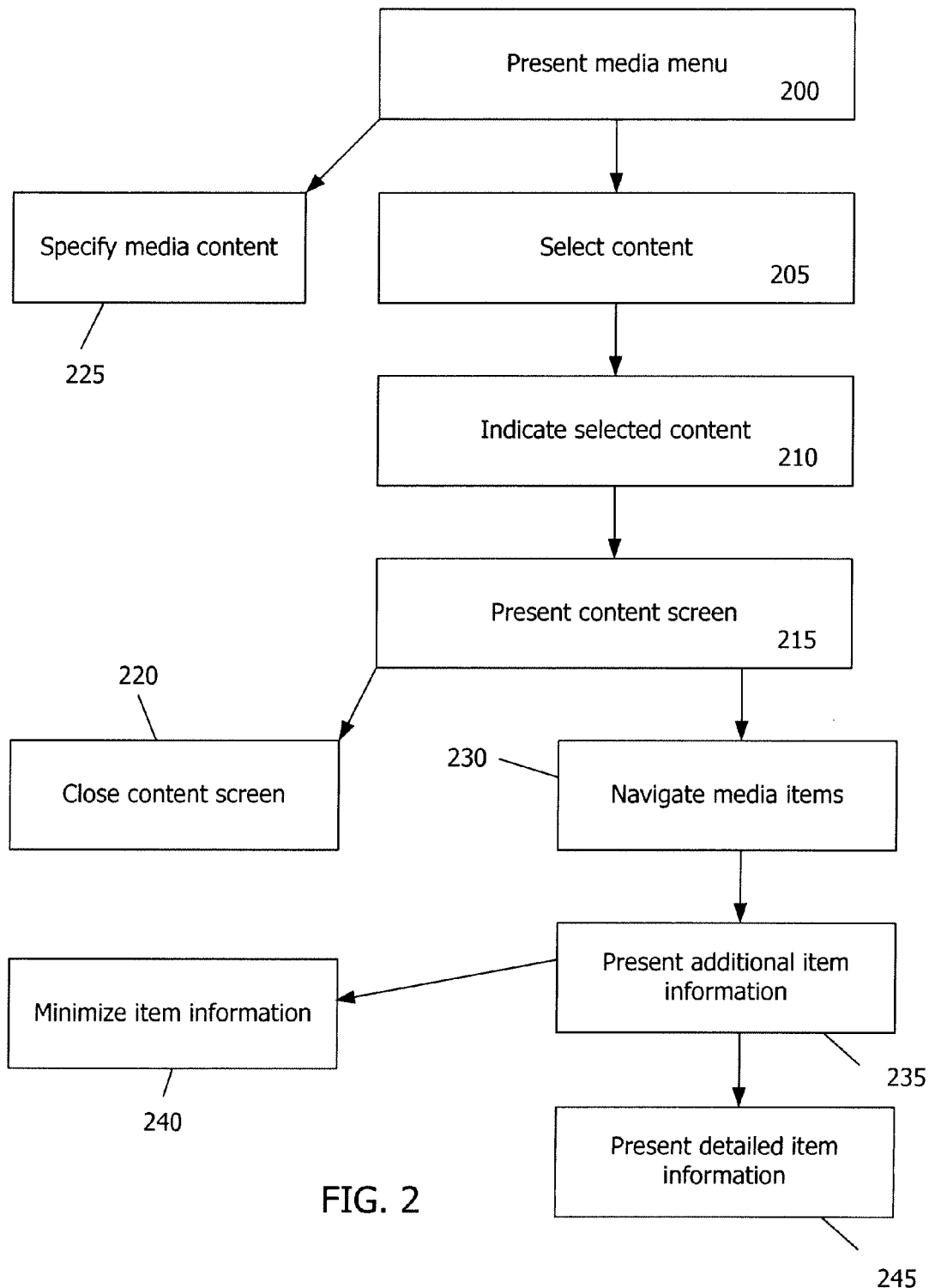
FIG. 2 illustrates a flow diagram in accordance with an aspect of the disclosed embodiments.
Figure 3:
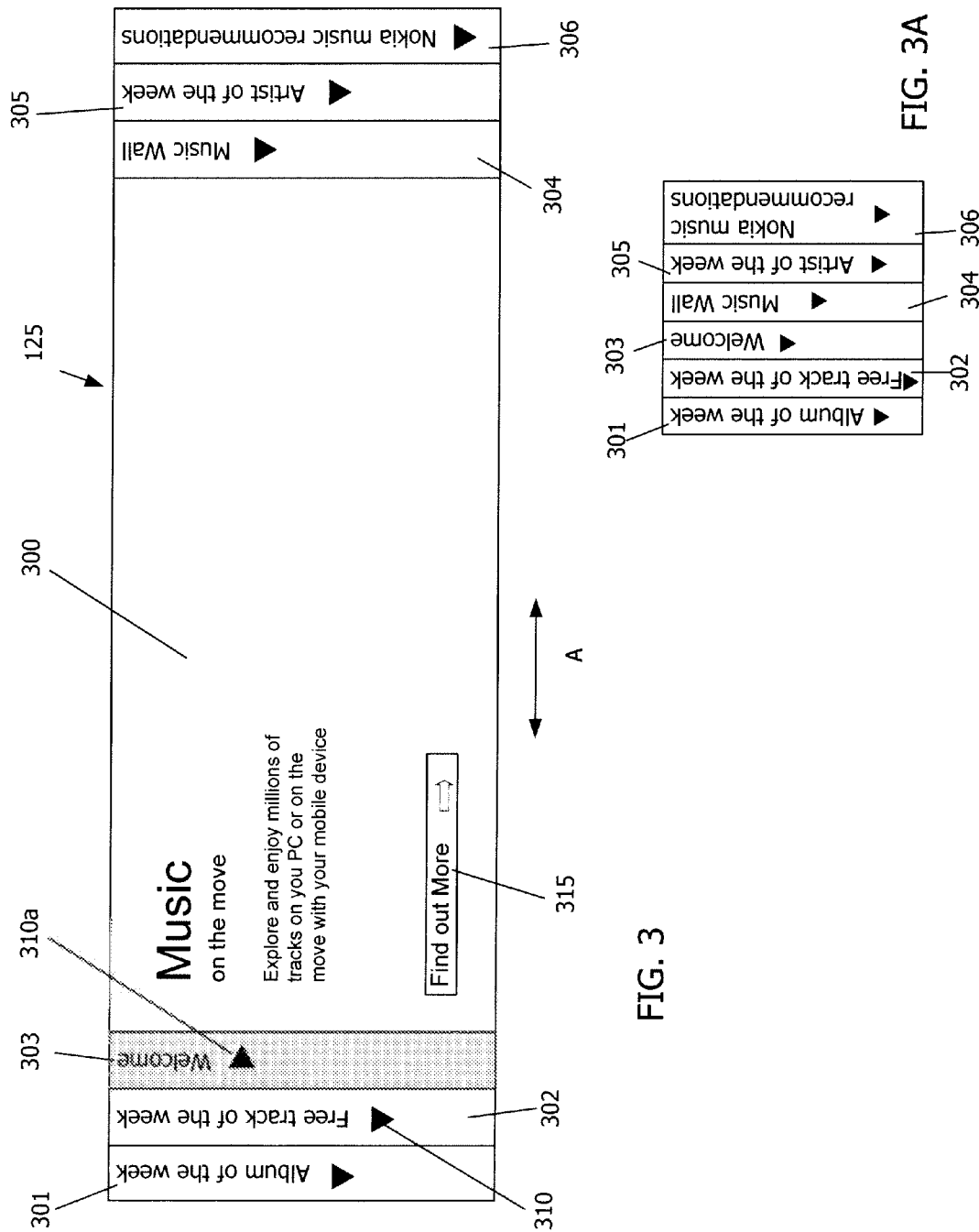
FIGS. 3-8 are illustrations of exemplary screen shots of a user interface in accordance with the disclosed embodiments.

Referring now to FIGS. 2 and 3, a flow chart illustrating one example of a process and an exemplary screen shot of the media menu 125 according to the disclosed embodiments are shown. In one embodiment, the media menu may be stored in a memory 182 of the system or in a remote storage device. In other embodiments, portions of the media menu may be stored in the memory 182 while other portions are retrieved from the remote storage device.

As can be seen in FIG. 3, the media menu 125 is presented to the user of the system 100 in any suitable manner (FIG. 2, Block 200). For example, the user may activate the media menu 125 for presentation to the user through another menu 124 of the system, from an icon that is linked to the media menu or by accessing a web page or a remote server. In this example, the media menu 125 includes six tabs or wall indicators 301-306 corresponding to a media content screen such as, for example, screen 300. In other examples the media menu 125 may include more or less than six tabs. The user may select or touch one of the screen tabs 301-306 so that the corresponding media content screen is presented (FIG. 2, Block 205).

The appearance of the selected tab 303 may change in any suitable manner to indicate to the user that the tab is selected (FIG. 2, Block 210). In this example, the tab 303 changes color and an arrow 310a is rotated from an inactive orientation (see arrow 310) to an active orientation. For example, when the screen corresponding to a tab is inactive or closed the arrow in the tab points in a direction towards a bottom of the display 114. When the screen corresponding to a tab is active or opened the arrow in the tab points in a direction towards a side of the display 114. In other examples, the tab arrows may point in any suitable directions to indicate the active and inactive media screens. In still other examples, the appearance of the active tab 303 may change so that the tab is animated, highlighted, outlined, and/or a font type/color of the indicator is changed.

In the exemplary screen shot shown in FIG. 3, the "welcome" screen tab 303 is selected so that the welcome screen 300 is presented (FIG. 2, Block 215). When a tab 301-303 is selected the other tabs, depending on a position of the selected tab, may slide, scroll or move on the display as the media screen is opened. For example, as can be seen in FIG. 3A, before selection the media indicators 301-306 may be adjacent each other in a manner similar to that shown with respect to indicators 301-303. Upon selection of the welcome screen tab 303, tab 304-306 may split off from the indicators 301-303 and slide, move or scroll across the screen in the direction of arrow A so that the welcome screen 300 is presented between tabs 303 and 304. In other embodiments, the welcome screen 300 may be presented in any suitable manner such as, for example, over the indicators 304-306. In still other embodiments, the welcome screen 300 may be presented on the display such that the indicators 301-306 are covered by the screen 300. In another example, the Welcome screen 300 may be presented with its corresponding indicator 303 while the other indicators 301, 302, 304-306 are hidden, covered or removed from the screen.

The welcome screen 300 may include any suitable information including, but not limited to, the type of media content items that are presented in the tabs 301, 302, 304-306, information about the media provider and/or media content items, advertisements, images, text, video and sound clips. In the example shown in FIG. 3, a selectable link or icon 315 may be presented to the user. Here, upon selection, the icon 315 causes the presentation of additional information about exploring the media content items. In other examples, the icon 315 may cause the presentation of advertisement information, advertiser web pages, artist web pages and/or information or any other suitable information or data.

Figure 4:
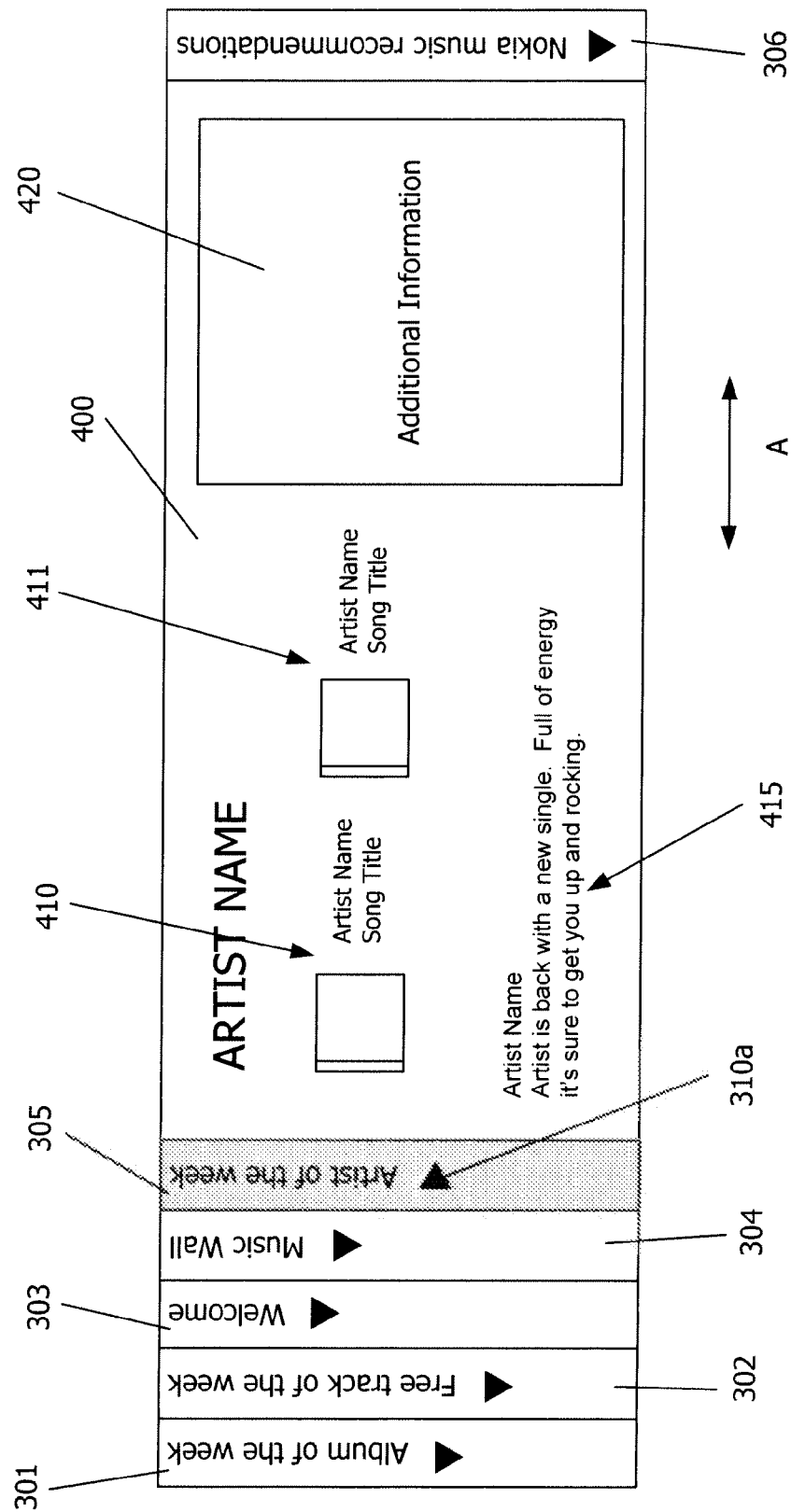

Referring now to FIG. 4, another exemplary screen shot in accordance with the disclosed embodiments is shown. In FIG. 4 the tab 305 is selected so the artist of the week screen 411 is presented in a manner substantially similar to that described above with respect to the welcome screen 300. It is noted that as the artist of the week screen 400 is opened the welcome screen 300 may be closed in a manner opposite to that described above. (FIG. 2, Block 220). For example, when the artist of the week tab 305 is selected the tabs 304, 305 may move, scroll or slide towards the welcome screen tab 303 in the direction of arrow A to remove or hide the welcome screen from the display 114. It is noted that the welcome screen 300 can also be closed by selecting the welcome screen tab 303 so that the indicators 304-306 slide towards the welcome screen indicator as described above.

In the exemplary screen shot shown in FIG. 4, the artist of the week screen 400 may include any suitable information pertaining to a predetermined artist. In this example, the screen 400 includes the artist's name, information about the artist 415, one or more song/album indicators 410, 411 and any suitable additional information 420. Each of the one or more song/album indicators 410, 411 may include an image of the song/album cover (i.e. album cover art) and/or a description of the song/album (e.g. artist and name of the song/album). In other examples, the song/album indicators may include any suitable information. The additional information 420 may be one or more photographs of the artist of the week, song lyrics, a music video, an advertisement or any other suitable information. In one example one or more of the artist information 415, song/album indicators 410, 411 or additional information 420 may be a selectable link that may cause the presentation of additional information. For example, selection of song/album indicator 410 may cause the presentation of information for purchasing the song/album. In other embodiments, selection of the song/album indicator may cause the presentation of the one or more songs through a speaker of the system 100.

It is noted that the one or more song/album indicators 410, 411 may be scrolled through by a user. For example, the user may move a pointing device in the direction of arrow A over the indicators 410, 411 so that the indicators are scrolled in the direction the pointing device is moved. In other embodiments the song/album indicators 410, 411 may be scrolled using any suitable keys 110 or pointing device (e.g. mouse, track ball, etc.) of the system 100.

Figure 5:
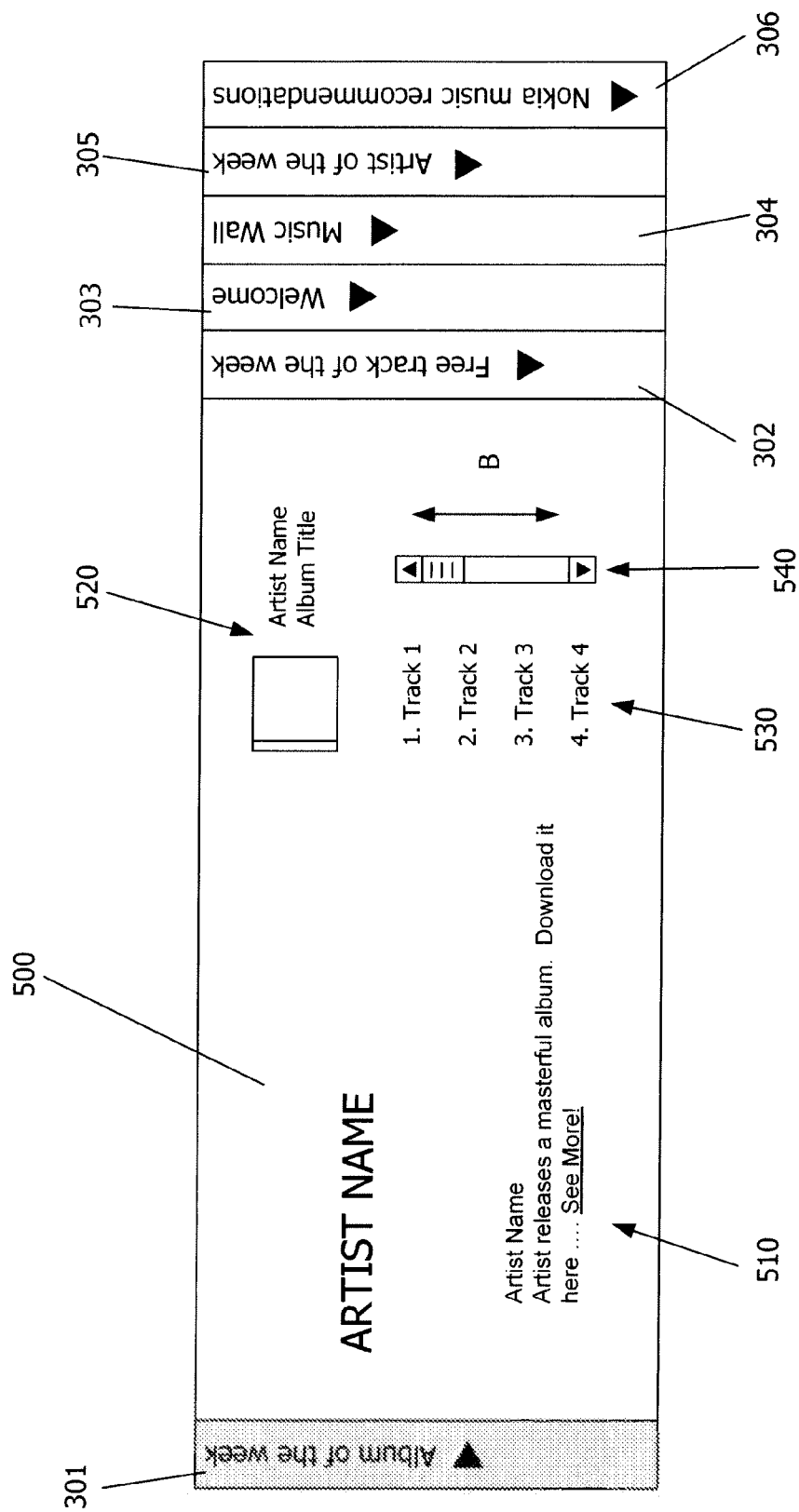

Referring now to FIG. 5 an exemplary screen shot of the exemplary album of week screen 500 is shown. The album of the week tab 301 may be selected and the album of the week screen may be presented in a manner similar to that described above. The album of the week screen 500 may include any suitable information about a predetermined album. For example the screen 500 may include that artist's name, information about the artist 510, information about the album 520 and a list of tracks 530 from the album. The album information 520 may be substantially similar to information 410, 411 described above with respect to FIG. 4. The artist information 510 and/or the album information 520 may be selectable, as described above, so that additional options are presented to a user, such as the option to purchase the album. It is noted that the media menu 125 of FIG. 1 may be connected to a remote server or store front for processing purchases. The remote server may also be configured to provide the packshots and other information described herein for display in the media menu.

In other examples, the selectable features of the screen 500 may cause presentation of detailed product information including, but not limited to, purchase price, availability and release dates. Each of the tracks in the track list 530 may also be selectable so that upon selection of a track at least a portion of the corresponding song is presented to the user. The track list 530 may also be a scrollable list such that the user may scroll the list in the direction of arrow B in the manner described above with respect to the song/album indicators 410, 411 of FIG. 4. A scroll bar 540 may also be provided for scrolling the track list 530. Volume controls and music player controls (e.g. play, pause, stop, fast forward, rewind) may also be presented in the screen 500 for selection and manipulation by a user.

Figure 6:
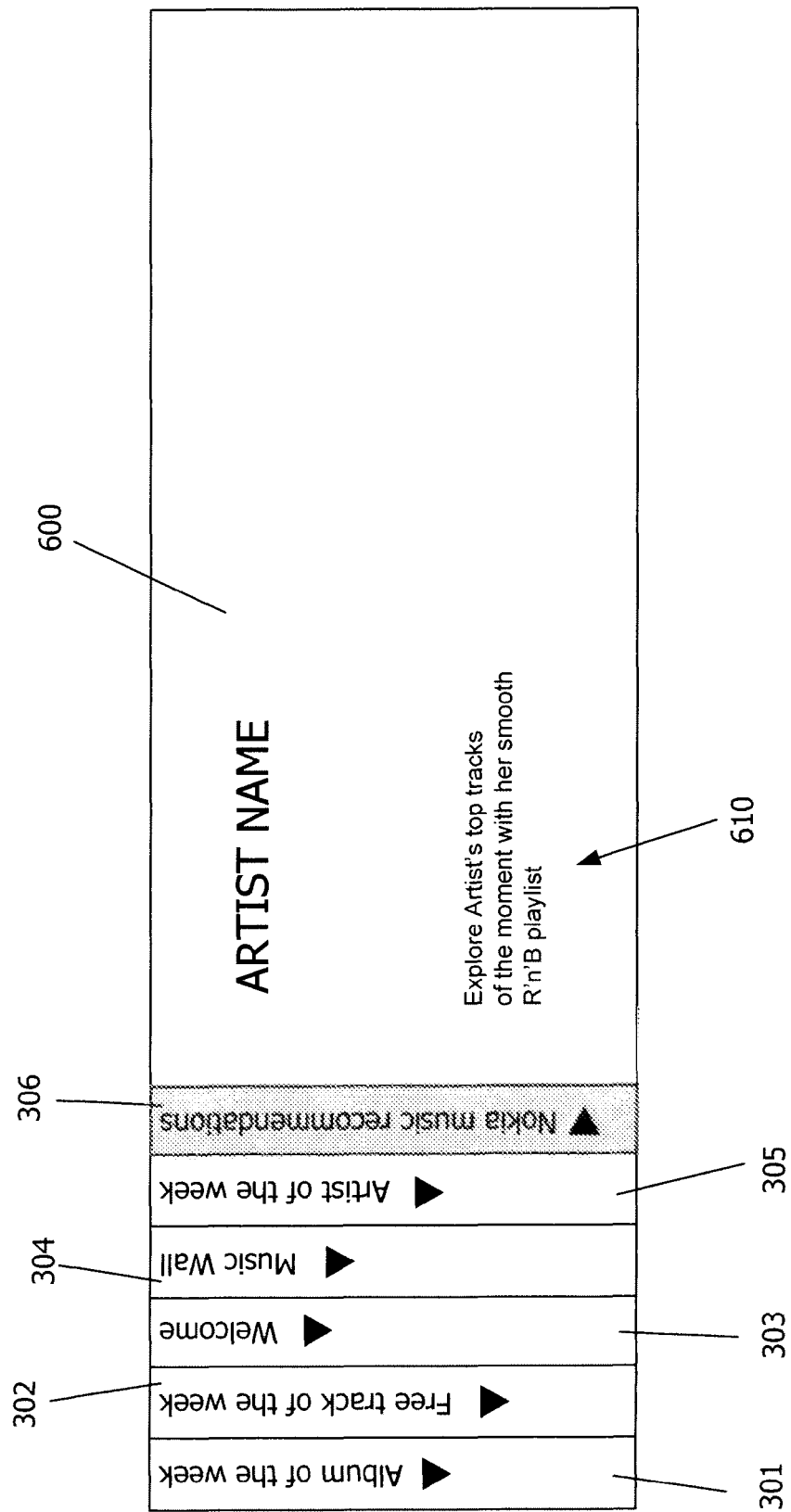

Referring to FIG. 6, an exemplary screen shot of the exemplary recommended music tab 306 is shown. In this embodiment, the recommended music screen 600 may include any suitable information including, but not limited to artist names and information about the artist's music 610. In this example only one artist is indicated but any suitable number of artists may be presented. The screen 600 may also include selectable features similar to, for example, features 410, 411 of FIG. 4 and 510-540 of FIG. 5 so that a user may sample music tracks or obtain additional information about a song, artist and/or album.

In one embodiment, the recommended music presented in the screen 600 may be selected by the provider based on, for example, most downloaded or purchased songs/albums, music reviews, most downloaded and/or purchased artists. In another embodiment, the media menu 125 of FIG. 1 may be configured to track and store, in any suitable memory within or external to the system 100, the user's purchase history and which artists, songs and/or albums the user reviewed or selected while using the media menu 125. The media menu 125 may, for example, present in the screen 600 artists, songs, albums and /or music genres for selection by a user based on the user's purchase patterns and/or browsing history. In still other embodiments, the recommended music presented in the screen 600 may be determined in any suitable manner. In another example, the media menu 125 may have user settable setting for specifying, for example, a music genre or artist to display in the recommended music screen 600.

In one embodiment, the user's history may be tracked as described above for the presentation of advertisements in media menu 125. For example, a user profile may be created by the media menu 125 based on the user's history and advertisements corresponding to the user's interests may be presented to the user. In another embodiment the advertisements may be tab specific so that one or more of the tabs 301-306 include advertisements related to the content of a respective tab. As a non-limiting example, the album of the week tab 301 may include advertisements pertaining to the album of the week including, but not limited to, the album's artist, the album's producer or record label and/or similar types of albums. In other embodiments, the tab specific advertisements can include any suitable advertising information.

In still other embodiments, the criteria for displaying advertisements in a tab can be the same or different for one or more of the tabs 301-306. The following are non-limiting examples of how advertisements can be displaying in the different tabs 301-306 based on different criteria. Advertisement number 1 may be displayed in tabs 301 and 303 independent of a user account and in tab 305 based on the tab contents. Advertisement number 2 may be displayed in tab 303 based on the demography of the user, in tab 304 based on the user's previous selections (i.e. history) and in tab 305 when the user is listening to, for example, a predetermined track of music. Advertisement number 3 may be shown in tab 304 when information is sent from a remote media server to the system 100. Other criteria for displaying advertisements include, but are not limited to, the size and/or position of the advertisement and the type of device the advertisement is presented on. For example, the advertisements, advertisement presentations, or advertising modes shown on a desktop computer may be different than the advertisements shown in a mobile communication device. In other embodiments, any suitable criteria may be used for displaying advertisements. The advertisements may be displayed for a predetermined time period (e.g. hours, days, weeks, months, etc.). The advertisements can also change from time to time. In one embodiment, some tabs may include advertisements while other tabs may not include advertisements.

As a non-limiting example, in one embodiment the advertisements displayed in the tabs include in its metadata the uniform or universal resource locator (URL) for indicating to an advertisement server that the advertisement is selected (e.g. by clicking on or touching the advertisement). The advertisement server may be similar to the remote server described herein and may provide or direct the user to the advertiser's web page. In other embodiments the advertisement server may provide any suitable information to the user upon activation of the advertisement in the tab. The advertisement server may track or record, for example, the number of times each advertisement is activated, which user activated the advertisement and in which tab 301-306 the advertisement was located. In other embodiments the advertisement server may record any suitable information related to the advertisements. The advertisement server may be configured to collect and manage the profile or activation history of the advertisements and may suggest new advertisements based on the collected information. The new advertisements may be suggested for placement in predetermined tabs or to one or more user accounts. Group advertisement profiles can also be created by the advertisement server for suggesting advertisements to groups of users based on the advertisement history of the group of users. The advertisement server may be configured to charge or bill advertisers based on the number of times each advertisement is viewed, on the time frame the advertisement is available or able to be viewed, or on any other suitable billing criteria.

Figure 7:
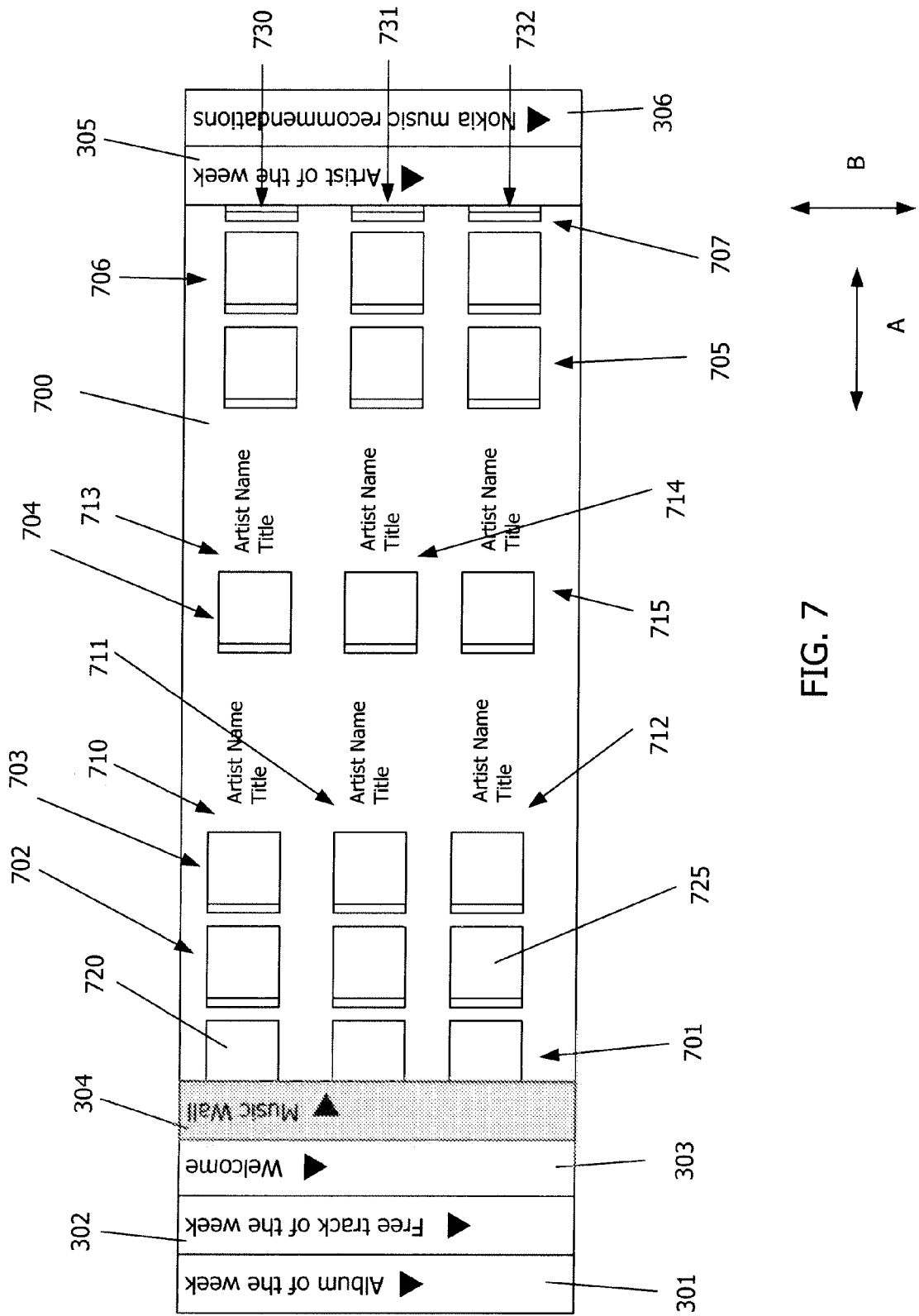

Referring now to FIG. 7, an exemplary screen shot of the music wall screen 700 is shown. In one embodiment, the music wall screen 700 can include a mix of new media content and/or best sellers from all music genres. In other embodiments, the music wall screen 700 can include media content from one or more genres so that the screen 700 has a customized look. The media menu 125 may be configured to allow a user to specify which media content items are to be presented in the music wall screen 700 through for example, a home page, the welcome screen 300 or any other suitable user selectable setting or option (FIG. 2, Block 225).

In this example the screen 700 includes rows 730-731 and columns 701-707 of packshots. It is noted that any suitable number of rows and columns may be presented in the screen 700. The packshots may be organized or listed in the screen 700 in any suitable manner. For example, in one embodiment the packshots may be arranged by genre and/or by alphabetical order by artist name. In other embodiments the packshots may be organized by release date.

In this example, the screen includes two primary packshot columns 703, 704 The remaining columns 701, 702, 705-707 will be referred to a secondary columns. In other embodiments, the screen may include any suitable number of primary and secondary columns. It is noted that while the disclosed embodiments are described with respect to primary and secondary columns, the disclosed embodiment would apply equally to primary and secondary rows. The packshots of the secondary columns may indicate a minimum amount of information to the user. For example, the secondary column packshots may be configured to include an image of an album cover (e.g. enough information to indicate to the user the contents of the packshot). In other embodiments the secondary packshots may include any suitable information. The primary packshots 710-715 of the primary packshot columns 703, 704 include more information than that presented by the secondary packshots. For example, the primary packshots 710-715 may include an image of the album cover, the artist name, the title of the album or song, purchase price and/or any other suitable information.

A user can navigate the music wall screen 700 by, for example, moving a pointing device in the direction of arrows A and/or B over the columns 701-707 and rows 730-732 so that the packshots are scrolled in the direction the pointing device is moved (FIG. 2, Block 230). In other embodiments the packshots may be scrolled using any suitable keys 110 or pointing device (e.g. mouse, track ball, etc.) of the system 100. In one embodiment the packshots may move as a unit (e.g. the rows and/or columns are fixed with respect to each other). In other embodiments each individual row 730-732 may be movable with respect to the other rows 730-732. For example, row 730 may move in the direction of arrow A while rows 731, 732 remain stationary. Likewise, each individual column 701-707 may be movable in the direction of arrow B with respect to the other columns. For example, column 703 may move in the direction of arrow B while the other columns remain stationary. In one embodiment only the rows are scrollable. In another embodiment only the columns are scrollable. In still other embodiments both the rows and columns are scrollable.

In other aspects of the disclosed embodiments the rows and columns may be scrolled by selecting a packshot. For example, if a secondary packshot 725 is selected the columns 701-707 of rows 730-732 or the columns 701-707 of row 732 may move in the direction of, for example, arrow A by one or more steps where a step is movement of the packshot from one column to the next column (e.g. from column 702 to either column 701 or 703). In other embodiments upon selection of a secondary packshot the packshot may move more than one step. For example, if packshot 720 is selected the columns may move in the direction of arrow A so that the packshot 720 is presented in one of the primary columns 703, 704. It is noted that the packshots may move in the direction of arrow B in a substantially similar manner.

In this example, as the columns 701-707 are scrolled in the direction of arrow A the packshots enter and leave the primary columns 703, 704 such that as the packshots enter the primary columns 703, 704 the additional or intermediate product information described above is presented to the user (FIG. 2, Block 235). As the packshots leave the primary columns 703, 704 the additional information is hidden from view of the user or otherwise removed from the display 114 such that the minimal information described above is presented to the user (FIG. 2, Block 240).

Figure 8:
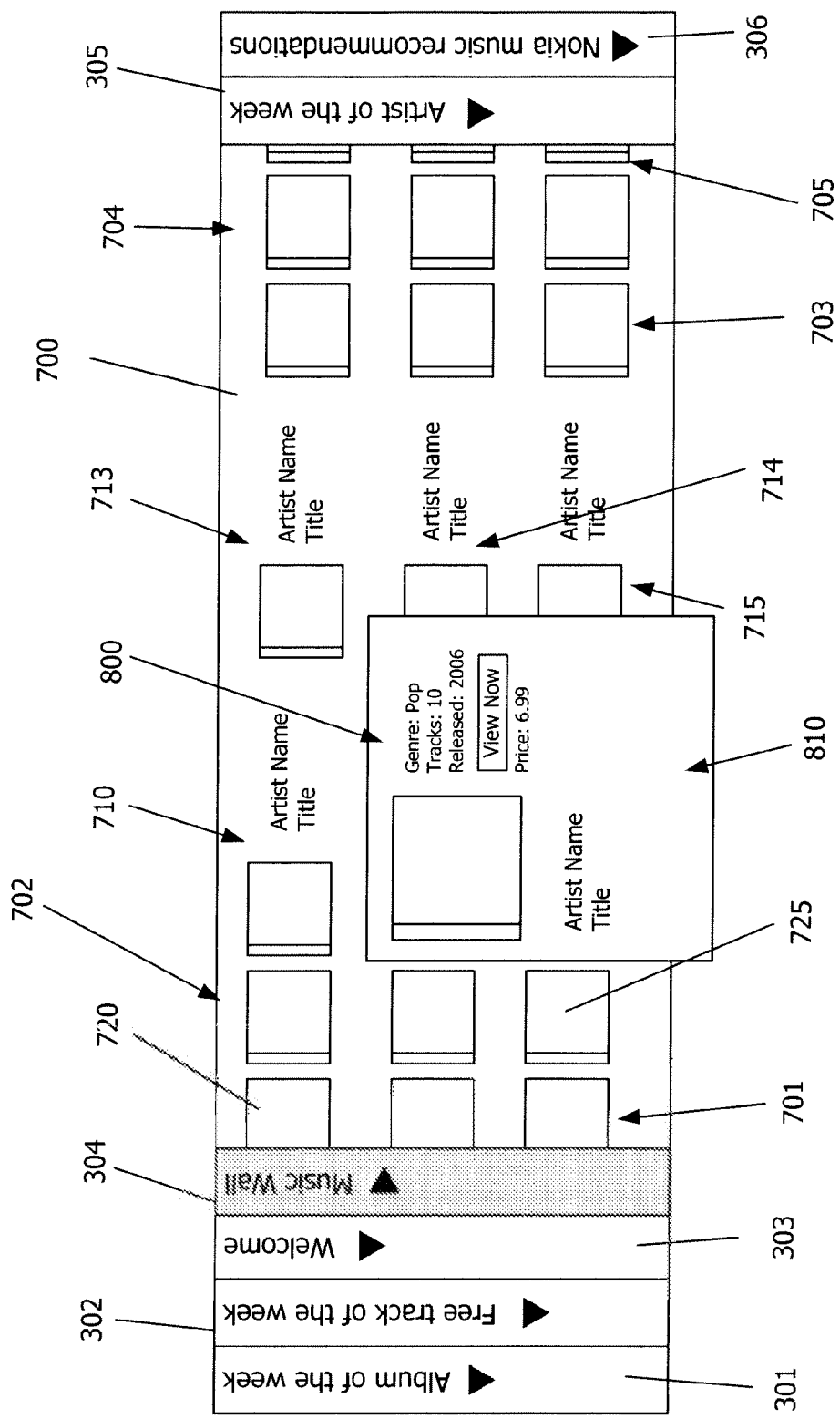

Referring to FIG. 8 the additional product information is changed to detailed product information 810 and the detailed product information 810 is presented to the user when one of the packshots 710-715 in the primary columns 703, 704 is selected (FIG. 2, Block 245). For example, if packshot 711 is selected a detailed information "box" or "window" 800 is presented. The box 800 can include any suitable product information including, but not limited to, a larger version of the packshot, cover artwork, artist name, album/song title, genre, number of tracks, release date, purchase price, links to song clips or additional artist information (e.g. artist website, etc.) and at least options to purchase the album or one or more songs from the album. In other embodiments, box 800 may include features configured to allow a user to access a wish list (e.g. list of items or products that the user would like to purchase or have purchased for the user), to stream clips of one or more songs, entire songs and/or the entire album and/or to download clips of songs or other information regarding the item being viewed. In still other embodiments, selecting packshot in either the primary or secondary columns causes the presentation of another item (e.g. song, album, artist) based on a recommendation. The recommendation may be based on any suitable criteria including, but not limited to, items similar to the one selected, on items that other users have purchased and/or viewed when viewing/purchasing the selected item.

In accordance with another aspect of the disclosed embodiments, the appearance of the media menu 125 may be adapted according to the browsing device or system. For example, where the browsing device includes a small display the appearance of the media menu 125 may be simpler such that, for example, one item is presented in each tab, the user views only one item at a time and/or a limited number of tabs are presented.

In still other aspects of the disclosed embodiments, the media menu 125 may be configured to "remember" what the user was viewing the last time a tab was selected and with what device the user was viewing the media menu 125. In this example, when the user returns to the media menu 125 and the previously viewed tab, the media menu 125 presents the same information in the same format as previously presented to the user.

As noted before any suitable tabs may be presented in the media menu 125. For example, as shown in the Figures the free track of the week tab 302 may present the user with information and/or options for downloading or otherwise acquiring free music. The types of information presented in the tabs can be settable by a user, be preset during manufacture of the system 100, specified by a remote server or any combination thereof.

Figure 9A:
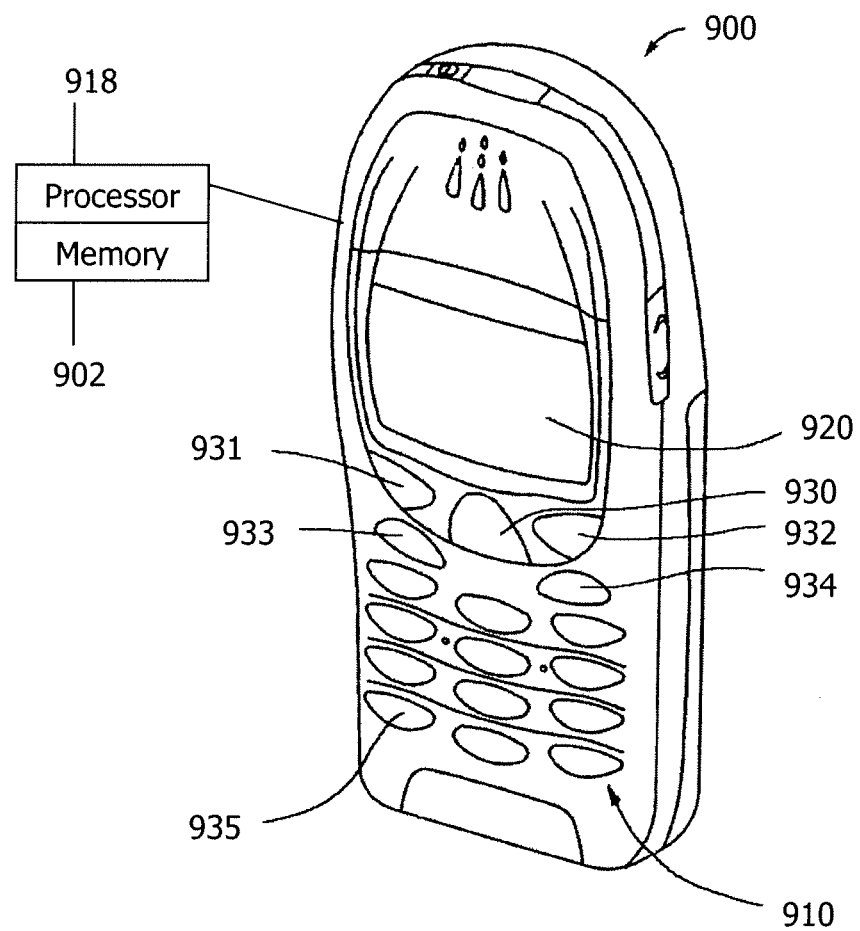
FIGS. 9A and 9B are illustrations of examples of devices that can be used to practice aspects of the disclosed embodiments.
Figure 9B:
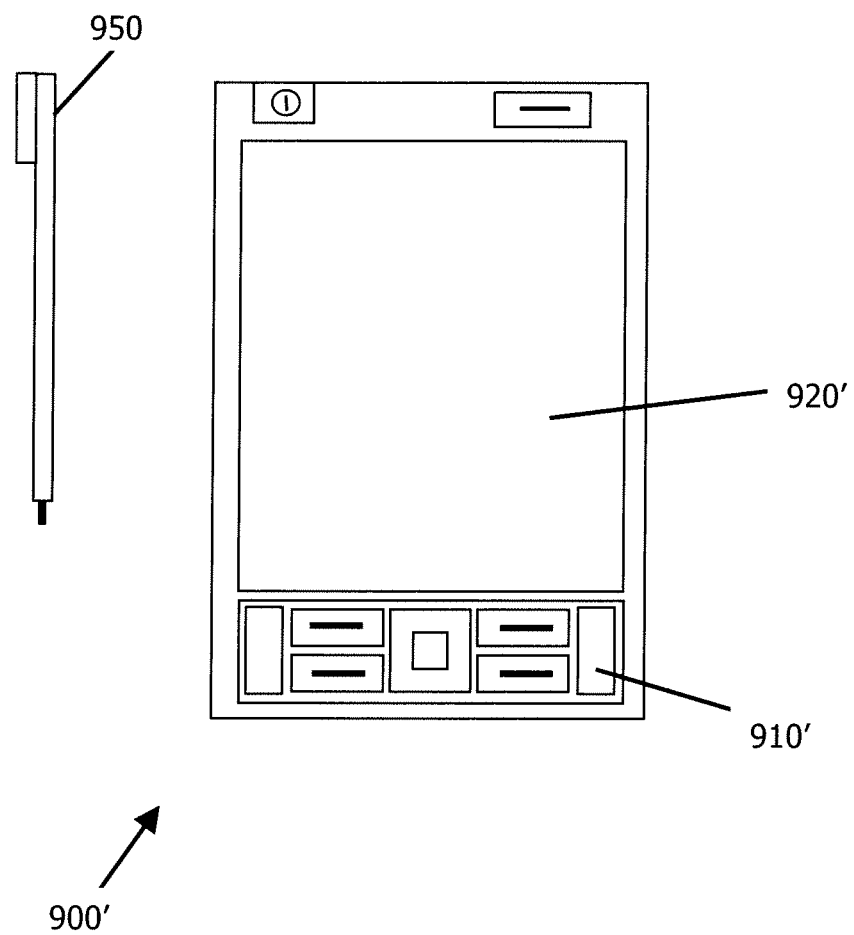

Examples of devices on which aspects of the disclosed embodiments can be practiced are illustrated with respect to FIGS. 9A and 9B. The terminal or mobile communications device 900 may have a keypad 910 and a display 920. The keypad 910 may include any suitable user input devices such as, for example, a multi-function/scroll key 930, soft keys 931, 932, a call key 933, an end call key 934 and alphanumeric keys 935. The display 920 may be any suitable display, such as for example, a touch screen display or graphical user interface. The display may be integral to the device 900 or the display may be a peripheral display connected to the device 900. A pointing device, such as for example, a stylus, pen or simply the user's finger may be used with the display 920. In alternate embodiments any suitable pointing device may be used. In other alternate embodiments, the display may be a conventional display. The device 900 may also include other suitable features such as, for example, a camera, loud speaker, connectivity port or tactile feedback features. The mobile communications device may have a processor 918 connected to the display for processing user inputs and displaying information on the display 920. A memory 902 may be connected to the processor 918 for storing any suitable information and/or applications associated with the mobile communications device 900 such as phone book entries, calendar entries, the media menu 125 described herein, etc.

Figure 10:
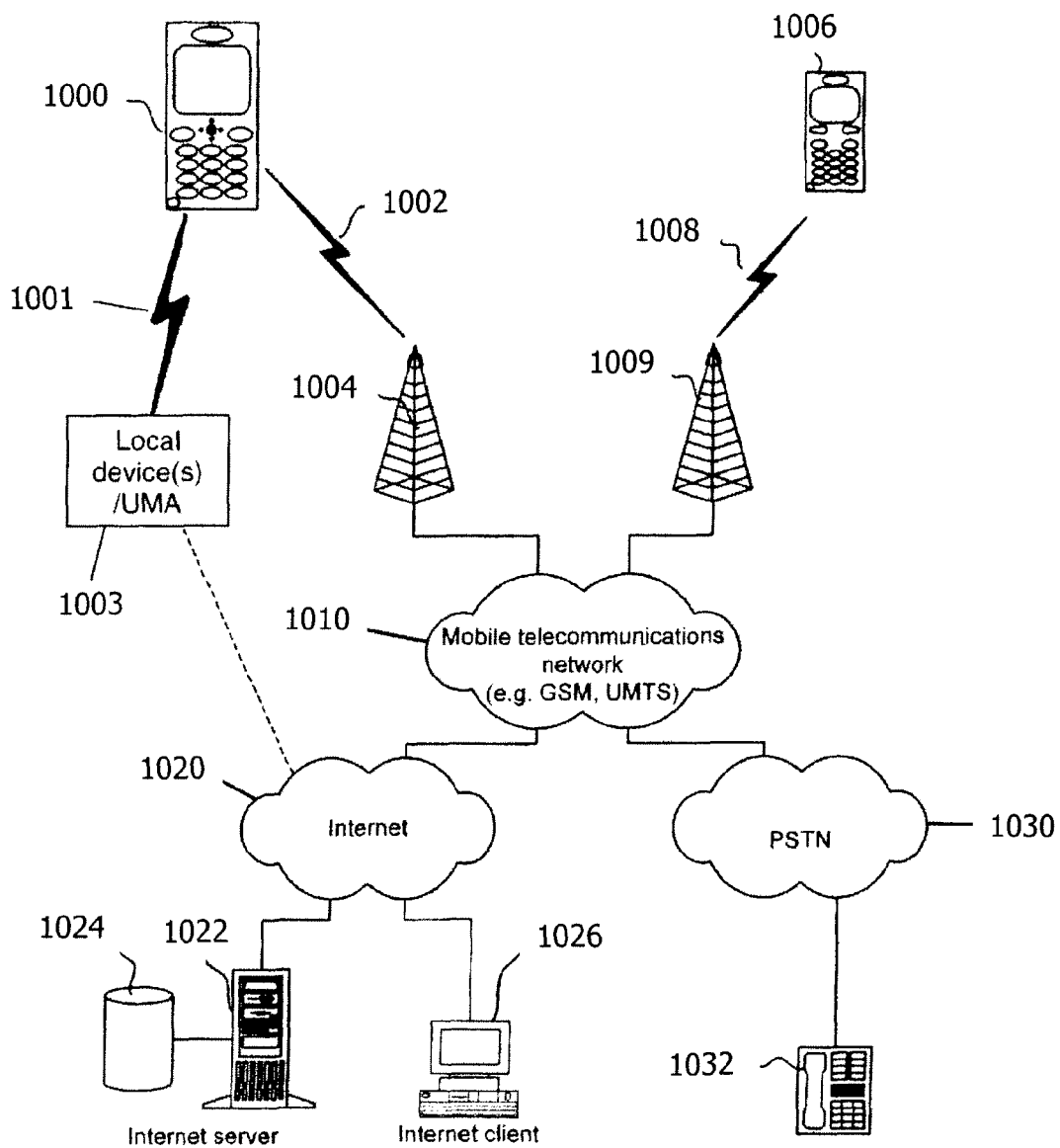
FIG. 10 illustrates a block diagram of an exemplary system incorporating features that may be used to practice aspects of the disclosed embodiments.

In the embodiment where the device 900 comprises a mobile communications device, the device can be adapted for communication in a telecommunication system, such as that shown in FIG. 10. In such a system, various telecommunications services such as cellular voice calls, worldwide web/wireless application protocol (www/wap) browsing, cellular video calls, data calls, facsimile transmissions, data transmissions, music transmissions, still image transmission, video transmissions, electronic message transmissions and electronic commerce may be performed between the mobile terminal 1000 and other devices, such as another mobile terminal 1006, a line telephone 1032, a personal computer 1051 and/or an internet server 122. It is to be noted that for different embodiments of the mobile terminal 1000 and in different situations, some of the telecommunications services indicated above may or may not be available. The aspects of the disclosed embodiments are not limited to any particular set of services in this respect.

The mobile terminals 1000, 1006 may be connected to a mobile telecommunications network 1010 through radio frequency (RF) links 1002, 1008 via base stations 1004, 1009. The mobile telecommunications network 1010 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 1010 may be operatively connected to a wide area network 1020, which may be the Internet or a part thereof. An Internet server 1022 has data storage 1024 and is connected to the wide area network 1020, as is an Internet client computer 1026. The server 1022 may host a worldwide web/wireless application protocol server capable of serving worldwide web/wireless application protocol content to the mobile terminal 1000.

A public switched telephone network (PSTN) 1030 may be connected to the mobile telecommunications network 1010 in a familiar manner. Various telephone terminals, including the stationary telephone 1032, may be connected to the public switched telephone network 1030.

The mobile terminal 1000 is also capable of communicating locally via a local link 1001 or 1051 to one or more local devices 1003 or 1050. The local links 1001 or 1051 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 1003 can, for example, be various sensors that can communicate measurement values to the mobile terminal 1000 over the local link 1001. The above examples are not intended to be limiting, and any suitable type of link may be utilized. The local devices 1003 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 1000 may thus have multi-radio capability for connecting wirelessly using mobile communications network 1010, wireless local area network or both. Communication with the mobile telecommunications network 1010 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 can include a communications module that is configured to interact with the system described with respect to FIG. 10.

Although the above embodiments are described as being implemented on and with a mobile communication device, it will be understood that the disclosed embodiments can be practiced on any suitable device incorporating a display, processor, memory and supporting software or hardware. In one embodiment, the system 100 of FIG. 1 may be for example, a personal digital assistant (PDA) style device 900' illustrated in FIG. 9B. The personal digital assistant 900' may have a keypad 910', a touch screen display 920' and a pointing device 950 for use on the touch screen display 920'. In still other alternate embodiments, the device may be a personal computer, a tablet computer, touch pad device, Internet tablet, a laptop or desktop computer, a mobile terminal, a cellular/mobile phone, a multimedia device, a personal communicator, a television or television set top box, a digital video/versatile disk (DVD) or High Definition player or any other suitable device capable of containing for example a display 114 shown in FIG. 1, and supported electronics such as the processor 918 and memory 902 of FIG. 9A.

The user interface 102 of FIG. 1 can also include menu systems 124 in the navigation module 122. The navigation module 122 provides for the control of certain processes of the system 100 including, but not limited to the navigation controls for the presentation content sampler/player described herein. The menu system 124 can provide for the selection of different tools and application options related to the applications or programs running on the system 100. In one embodiment, the menu system 124 may provide for the selection of the media menu 125 or features associated with the media menu 125 such as, for example, any suitable setting features including, but not limited to, the settable features described herein. In the embodiments disclosed herein, the navigation module 122 receives certain inputs, such as for example, signals, transmissions, instructions or commands related to the functions of the system 100, such as information to be presented in the media menu 125. Depending on the inputs, the navigation module interprets the commands and directs the process control 132 to execute the commands accordingly.

Referring again to FIG. 1, the display 114 of the system 100 can comprise any suitable display, such as noted earlier, a touch screen display, proximity screen device or graphical user interface. In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an liquid crystal display (LCD) with optional back lighting, such as a thin film transistor (TFT) matrix capable of displaying color images. A touch screen may be used instead of a conventional liquid crystal display.

The system 100 may also include other suitable features such as, for example, a camera, loudspeaker, connectivity port or tactile feedback features.

Figure 11:
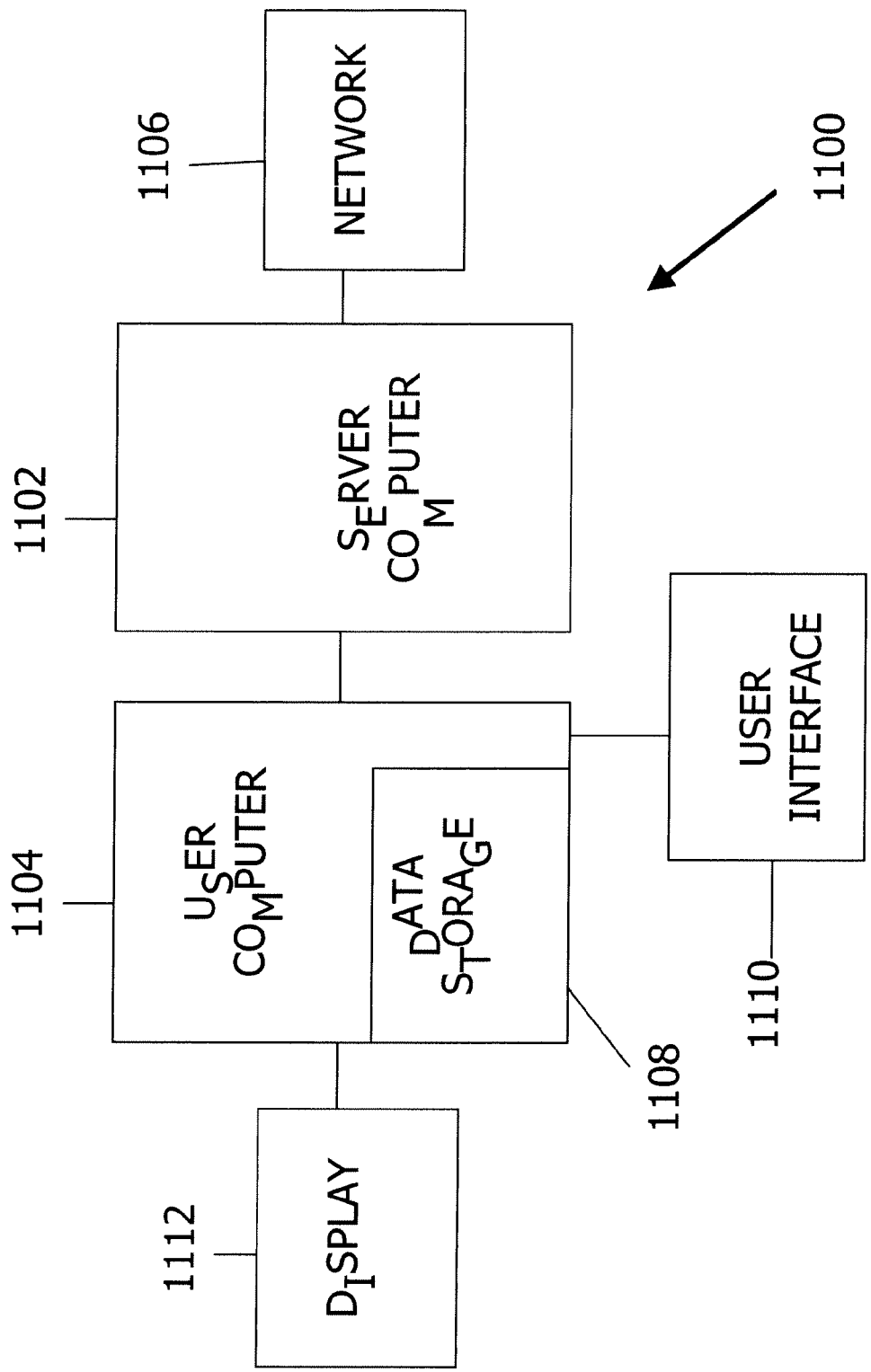
FIG. 11 is a block diagram illustrating the general architecture of an exemplary system in which the exemplary devices of FIGS. 9A and 9B may be used.

The disclosed embodiments may also include software and computer programs incorporating the process steps and instructions described above that are executed in different computers. FIG. 11 is a block diagram of one embodiment of a typical apparatus 1100 incorporating features that may be used to practice aspects of the invention. The apparatus 1100 can include computer readable program code means for carrying out and executing the process steps described herein. As shown, a computer system 1102 may be linked to another computer system 1104, such that the computers 1102 and 1104 are capable of sending information to each other and receiving information from each other. In one embodiment, computer system 1102 could include a server computer adapted to communicate with a network 1106. Computer systems 1102 and 1104 can be linked together in any conventional manner including, for example, a modem, wireless, hard wire connection, or fiber optic link. Generally, information can be made available to both computer systems 1102 and 1104 using a communication protocol typically sent over a communication channel or through a dial-up connection on an integrated services digital network (ISDN) line. Computers 1102 and 1104 are generally adapted to utilize program storage devices embodying machine-readable program source code, which is adapted to cause the computers 1102 and 1104 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 1102 and 1104 may also include a microprocessor for executing stored programs. Computer 1102 may include a data storage device 1108 on its program storage device for the storage of information and data. The computer program or software incorporating the processes and method steps incorporating aspects of the invention may be stored in one or more computers 1102 and 1104 on an otherwise conventional program storage device. In one embodiment, computers 1102 and 1104 may include a user interface 1110, and a display interface 1112 from which aspects of the invention can be accessed. The user interface 1110 and the display interface 1112 can be adapted to allow the input of queries and commands to the system, as well as present the results of the commands and queries.

The embodiments described herein provide a user with a comprehensive and interactive discovery and purchase mechanism. The embodiments described herein allow for purchase of media content in a quick manner. Large catalogues of media content are displayed to the user in a carousel format allowing the user to easily navigate and sample the media content. The media content are presented in configurable tabs for customizing the contents depending on, for example user preferences and/or popular media items.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
Causing display of one or more content items in at least one of scrollable rows or columns; causing display of reduced content information for content items outside of at least one primary row or column, and intermediate content information for other content items in the at least one primary row or column; and in response to selection of a content item outside the at least one primary row or column:
a) causing a column or row comprising the selected content item to scroll such that the selected content item is relocated to the at least one primary row or column, and
b) causing display of intermediate content information to change to detailed content information based upon the selected content item; wherein the display of the reduced and intermediate content information corresponding to unselected content items continues to be displayed in at least one of adjacent scrollable rows or columns while the detailed content information for the selected content item is displayed.

2. The method of claim 1, further comprising changing the reduced content information of an unselected content item to the intermediate content information based on scrolling of the unselected content item from outside of the at least one primary row or column to inside the at least one primary row or column.

3. The method of claim 1, wherein the content items include at least one of an indication of an artist, genre, cover art, a link to information related to the content item or a link to recommended content.

4. The method of claim 1, wherein each of the rows and columns are individually scrollable or scrollable as a unit.

5. The method of claim 1, wherein the detailed content information includes at least an option to purchase an item related to the content item.

6. A computer program product comprising at least one non-transitory computer-readable storage medium having computer-executable program code instructions stored therein, the computer-executable program code instructions comprising program code instructions to:
cause display of one or more content items in at least one of scrollable rows or columns; cause display of reduced content information for content items outside of at least one primary row or column, and intermediate content information for other content items in the at least one primary row or column; and in response to selection of a content item outside the at least one primary row or column: a) cause a column or row comprising the selected content item to scroll such that the selected content item is relocated to the at least one primary row or column, and b), causing display of intermediate content information to change to detailed content information based upon the selected content item; wherein the display of the reduced and intermediate content information corresponding to unselected content items continues to be displayed in at least one of adjacent scrollable rows or columns while the detailed content information for the selected content item is displayed.

7. The computer program product of claim 6, wherein the computer-executable program code instructions further comprise program code instructions to change the reduced content information of an unselected content item to the intermediate content information based on scrolling of the unselected content item from outside of the at least one primary row or column to inside the at least one primary row or column.

8. The computer program product of claim 6, wherein each of the rows and columns are individually scrollable or scrollable as a unit.

9. An apparatus comprising:
at least one processor and at least one memory including computer program code, the at least one memory and the computer program code configured to, with the processor, cause the apparatus to at least:
cause display of one or more content items in at least one of scrollable rows or columns; cause display of reduced content information for content items outside of at least one primary row or column, and intermediate content information for other media content items in the at least one primary row or column; and in response to selection of a content item outside the at least one primary row or column: a) causing a column or row comprising the selected content item to scroll such that the selected content item is relocated to the at least one primary row or column, and b), causing display of intermediate content information to change to detailed content information based upon the selected content item; wherein the display of the reduced and intermediate content information corresponding to unselected content items continues to be displayed in at least one of adjacent scrollable rows or columns while the detailed content information for the selected content item is displayed.

10. The apparatus of claim 9, wherein the at least one memory and the computer program code are further configured to, with the processor, cause the apparatus to at least change the reduced content information of an unselected content item to the intermediate content information based on scrolling of the unselected content item from outside of the at least one primary row or column to inside the at least one primary row or column.

11. The apparatus of claim 9, wherein the content items include at least one of an indication of an artist, genre, cover art, a link to information related to the content item or a link to recommended content.

12. The apparatus of claim 9, wherein the detailed content information includes at least an option to purchase an item related to the content item.

13. A system comprising: a communication device including an input device configured to cause selection of content items, a display configured to display the content items and a processor connected to the input device and display, the processor being configured to: cause display of one or more content items in at least one of scrollable rows or columns; cause display of reduced content information for content items outside of at least one primary row or column, and intermediate content information for other content items in the at least one primary row or column; and in response to selection of a content item outside the at least one primary row or column: a) cause a column or row comprising the selected content item to scroll such that the selected content item is relocated to the at least one primary row or column, and b), causing display of intermediate content information to change to detailed content information based upon selected content item; wherein the display of the reduced and intermediate content information corresponding to unselected content items continues to be displayed in at least one of adjacent scrollable rows or columns while the detailed content information for the selected content item is displayed.

14. The system of claim 13, further comprising a remote server in communication with the communication device for providing content item information to the communication device, the content item information including one or more of album cover art, artist information, album/song information and purchasing information.

15. The system of claim 13, wherein one or more of the communication device and the remote server are configured to record a purchase/browsing history of a user and present advertisement or listening/purchasing options to the user based on the user purchase/browsing history.

16. The system of claim 13, wherein one or more of the communication device and the remote server are configured to record the arrangement of content items in a media content screen so that when a user returns to the media content screen the content items are presented according to the recorded arrangement.

17. The method of claim 1, further comprising:
during a scrolling of at least a row or column, causing at least one row or column parallel to the scrolling row or column to remain stationary.

18. The computer program product of claim 6, wherein the computer-executable program code instructions further comprise program code instructions to:
during a scrolling of at least a row or column, cause at least one row or column parallel to the scrolling row or column to remain stationary.

19. The apparatus of claim 9, wherein the at least one memory and the computer program code are further configured to, with the processor, cause the apparatus to at least:
during a scrolling of at least a row or column, cause at least one row or column parallel to the scrolling row or column to remain stationary.

20. The method of claim 1, wherein the method further comprises, in response to the scrolling, and in an instance in which an unselected content item is relocated from the at least one primary row or column to outside the at least one primary row or column, causing respective displayed intermediate content information to change to reduced content information.

* * * * *